March 24, 1925. 1,530,899
F. LIMON
WHISTLE OPERATED BY STEAM OR COMPRESSED GAS AND INTENDED FOR USE
UPON RAILROADS OR FOR NAVIGATION, AVIATION, OR LIKE PURPOSES
Filed July 24, 1923
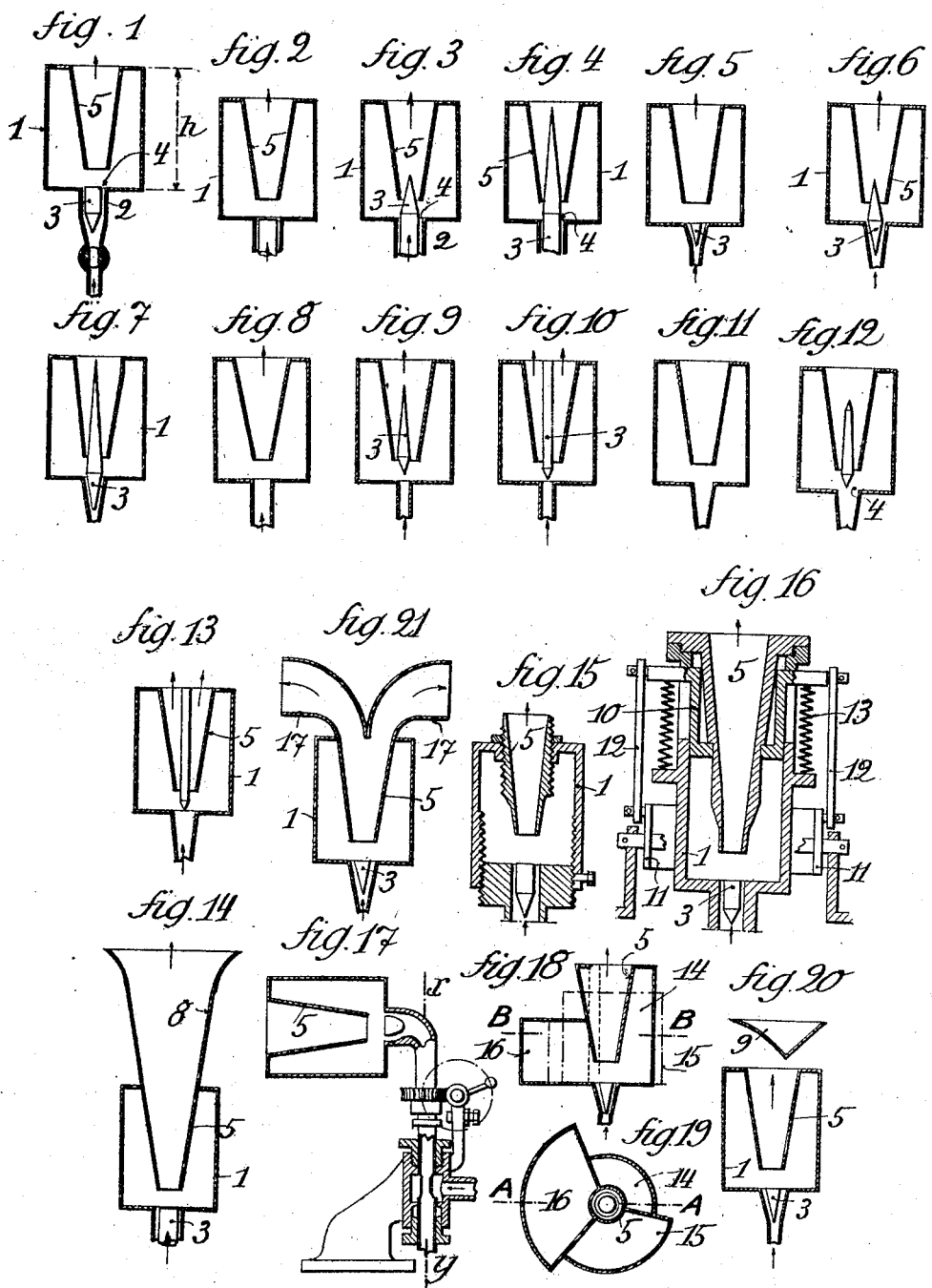
Inventor
F. Limon
By Marks & Clerk
Attys Patented Mar. 24, 1925.

1,530,899

UNITED STATES PATENT OFFICE.

FRANÇOIS LIMON, OF VERSAILLES, FRANCE.

WHISTLE OPERATED BY STEAM OR COMPRESSED GAS AND INTENDED FOR USE UPON RAILROADS OR FOR NAVIGATION, AVIATION, OR LIKE PURPOSES.

Application filed July 24, 1923. Serial No. 653,610.

*To all whom it may concern:*

Be it known that I, FRANÇOIS LIMON, a citizen of the Republic of France, and residing at Versailles (Seine et Oise Department), No. 13, rue Baillet Reviron, in the Republic of France, have invented a certain new and useful Whistle operated by steam or compressed gas and intended for use upon railroads or for navigation, aviation, or like purposes, of which the following is a specification.

My invention relates to a whistle operated by steam or compressed gas.

The appended drawings shew by way of example various forms of construction of the said whistle.

Figs. 1 to 14 represent different forms of construction in axial section.

Figs. 15, 16, 17 and 18 are vertical sections of other constructional forms, the latter according to the line A—A Fig. 19.

Fig. 19 is a horizontal section on the line B—B Fig. 18.

Figs. 20 and 21 are vertical axial sections of two other constructional forms.

The whistle according to my invention is of the type comprising a bell-shaped element, but it differs essentially from the known devices of this type in that the bell 1 (Fig. 1) is not circular but annular, and the vapour or gas under pressure is discharged from a central orifice 2 within the same instead of escaping to the exterior. In principle, the fluid is discharged from the inlet conduit in the form of an annular, cylindrical or conical stream, Fig. 5, whose section has the shape of a ring, but it might have the shape of a polygon, or any other suitable regular or irregular form.

In the case of an annular cylindrical jet, the core 3 may extend outwardly of the plane of evacuation 4, Figs. 3 and 4, and the same will be true for the annular conical jet, Figs. 6 and 7.

One may also use a circular jet without core, Fig. 8, or with core, Figs. 9 and 10, or a conical jet without core, Fig. 11, or with core, Figs. 12 and 13. In this case likewise, the jet may have a circular or polygonal section, or any desired regular or irregular form.

Whatever may be the disposition adopted, the stream of fluid is so directed that a part of the same will enter the bell 1. The fluid escapes through a central conduit 5 of a divergent or simply a cylindrical form, which may contain or not in the interior an extension of the core 3. The divergent portion and its core may have longitudinal and transverse sections, which are regular or not, and the same conditions will prevail for the bell. The divergent portion 5 may be completed by a trumpet-shaped part, Fig. 14. The steam inlet to the whistle is controlled by a slide valve or by a flat valve or clack valve, or by a simple cock.

The type of whistle according to my invention presents the following advantages.

1. Concentration of the discharge section whereby the vibration of the air produced by the alternations of flow and arrest of flow of the fluid will have the maximum amplitude, so as to obtain the maximum range of sound for a given amount of energy.

2. Concentration of the sound in plane waves according to the axis of the apparatus in the direction of the discharge of fluid, whereby the waves may be directed, by reenforcing them in the corresponding direction.

The said advantage is very important for the following uses:

*a.* For railroad use, the engine driver is to be provided with a whistle of sufficient power to be heard by the brakemen at the rear end of the longest trains, in spite of the noise due to the train, and this is to be carried out with the least disturbance to dwellers along the railroad. Like conditions prevail for the warning whistles for repeating the track signals upon locomotives. To obtain this result, the axis of the apparatus has the horizontal position, with the trumpet turned backwards.

*b.* For navigation and aviation, the vessels or aircraft should be provided with a whistle acting at a great distance, even during a fog, which condition is particularly unfavourable for the propagation of sound waves. In this case the trumpet is turned towards the front.

*c.* The bell can be given as large a volume as is desired, since this volume is not limited as in the known types of bell by the diameter of the fluid discharge ring or by a special shape to be given to the bell, but is quite independent of the transverse dimensions of the jet, since the bell extends outwardly of the latter. Since the bell can be given any desired volume, this will provide for the best operation of the whistle.

3. The consumption of fluid is reduced to a minimum, since the apparatus is operated in conditions of maximum yield. This is an important advantage for whistles used upon electric trains, since the compressed air whistles employed in this case are to be connected with tanks which by reason of their relatively small size will allow but a small consumption of fluid, especially when said tanks are used for continuous braking.

4. The waves are directed in the simplest manner and with devices occupying the minimum space, since the waves are directed at the beginning of the vibration.

5. The sound can be distributed as desired in the different directions. To obtain this result, the axis of the apparatus will be either horizontal, vertical or oblique, and the said apparatus is completed in the following manner:

a. Either by an acoustic reflector 9 of suitable shape which may be placed opposite the outer aperture of the diverging element or trumpet, or may be engaged wholly or partially within the latter, it being feasible to use a regular or irregular form for the said acoustic reflector, Fig. 20.

b. Or by a trumpet of regular or irregular form, partitioned or not, for directing and diffusing the sound waves according to the result to be obtained. For this purpose, recourse may be had to a cellular partitioning, and the cross-section of the cellular conduits may have any desired regular or irregular form. The divergent element may be partitioned in the same manner as for the trumpet.

Further, the apparatus may comprise various trumpets, partitioned or not, as desired. Fig. 21 shows a whistle with two oppositely disposed trumpets 17, this arrangement being chiefly applicable to whistles for passengers' alarm devices which are to be heard throughout the whole length of the train, both at the front and rear. The height $h$ of the inner end of the bell, Fig. 1, above the discharge orifice will depend upon the note which is to be given to the sound of the whistle. Use can be made to this end of a screw adjustment as shown in Fig. 15. The screwthreaded bell 1 can be turned on its seat in either direction so as to vary the note given by the whistle within stated limits. A complementary adjustment can also be had by rotating either way the divergent element which is screwed into the bell.

The said apparatus can be used for the emission of special signals which may be produced in determined conditions, according to a given code, in the following manner:

a. By disposing within the said bell a piston 10 actuated by the levers 11 and links 12, or by like means, Fig. 16, together with reaction springs 13 or weights. The fluid inlet to the whistle being preliminarily opened, the piston 10 is given a reciprocating motion between its end positions so as to produce a series of characteristic modulations in the apparatus.

b. By turning the horizontally disposed whistle about a vertical axis $x\ y$, Fig. 17, whereby it shall move successively and at various times through all the azimuths, and this will afford variations in intensity of the characteristic sound.

This arrangement is particularly valuable for distress signals, and by means of a suitable apparatus a vessel can send out such signals which are to have the maximum range in all directions. For distress signals upon trains, it is simply necessary to turn the device towards the stations or trains which are to receive the signals. In normal use, the trumpet will be obviously turned towards the train coupled to the locomotive. The rotating whistle, Fig. 17, is chiefly available for river navigation, since the vessels are required to signal their presence at a considerable distance in an exact direction, especially as concerns the locks. With my apparatus, vessels can produce code signals while at the same time giving the minimum inconvenience to dwellers along the shore. For navigation and aviation purposes, the apparatus might be mounted on a universal joint so as to be turned in all directions.

c. By alternately connecting the bell either with tanks under pressure or at atmospheric pressure, or directly with the atmosphere, and this will produce varied acoustic effects.

If desired, the bell may be provided with orifices, adjustable or not, for an additional adjustment of the operation of the whistle. Various holes will be further provided to avoid any accumulation of rain water or condensed water at the bottom of the bell. The annular bell can be divided into radial cells of unequal depth, having like or unlike volumes, so as to obtain the simultaneous emission of various sounds.

Figs. 18 and 19 shew a bell having three cells 14, 15, 16 so disposed as to emit three sounds.

The special arrangements above set forth may be wholly or partially obtained with a single whistle. A number of apparatus may be placed behind each other or in staggered disposition, or otherwise beside each other with suitable spacing, and these can be supplied by a common inlet or by separate inlets, so as to obtain sounds having the same tone or having different tones which are capable of interfering, whereby the sound may be strengthened in particular directions.

Further, the said apparatus may comprise all the additions which are in common use upon whistles such as trumpets, reflectors, resonating devices and the like.

The apparatus can be made in all required sizes and of suitable material such as wood, metal or the like, and it is adapted for all uses, and chiefly as an alarm whistle and a whistle for marine buoys.

The said apparatus may be further employed as a portable whistle and is actuated either by the human breath, being used as an operating whistle for railroads, navigation and the like, or it can be actuated by compressed gas, chiefly for acoustic communications to armies, and the pitch of the sound can be varied according to circumstances by the arrangement Fig. 15.

Obviously, the central conduit may be given any desired form such as divergent, cylindrical, convergent, or convergent and divergent, with or without interposition of cylindrical elements.

By varying the size and shape of said conduit, either with or without variation of the volume of the bell, I am enabled to vary at will the pitch of the sound within very wide limits.

The whistle according to my invention has the very special characteristic in that the fluid supplied to the bell and acting to interrupt the main jet in a periodic manner, is in the same manner as the jet and by reason of the counter-pressure produced by the central conduit, discharged substantially at the same pressure as the jet at the outlet of the conduit and hence produces a whistling noise which is about the same as produced by the main jet, whereby the whistle becomes double-acting.

The great advantages of this arrangement consists in the fact that all the fluid supplied to the whistle is entirely used to produce the whistling effect, without loss of any portion into the atmosphere, as in the known single-acting whistles, and the maximum yield will be thus obtained.

Obviously, one of the features of the invention consists in the production of a double-acting whistle.

This feature may be adapted to other types of known whistles having (or not) movable elements. To obtain this result, it is simply necessary to arrange the device so that the fluid supplied to the bell, in the same manner as for the fluid whose flow it interrupts, is obliged to circulate, when issuing into the atmosphere, through an orifice of suitable dimensions which may (or not) be the same orifice as used for the main jet.

I claim:—

1. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice located in the vicinity of the inlet orifice, the discharge conduit and a wall of the bell defining an annular chamber for the fluid vibrations.

2. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice registering with the inlet orifice, the discharge conduit and a wall of the bell defining an annular chamber for the fluid vibrations.

3. A whistle operated by a compressed fluid comprising a bell adapted to produce vibrations of the fluid discharging therethrough, a fluid inlet orifice opening into the bell, a discharge conduit arranged substantially centrally of the bell and having a normally open discharge orifice registering with the inlet orifice, the discharge conduit and a wall of the bell defining an annular chamber for the fluid vibrations, the discharge and inlet orifices cooperating so that a part of the fluid stream moving from the inlet orifice enters the discharge conduit and a part of said stream enters the annular chamber.

4. A whistle operated by a compressed fluid comprising a bell adapted to produce vibrations of the fluid discharging therethrough, a fluid inlet orifice opening into the bell, a divergent discharge conduit arranged substantially centrally of the bell and having a discharge orifice located in the vicinity of the inlet orifice, the discharge conduit and a wall of the bell defining an annular chamber for the fluid vibrations.

5. A whistle operated by a compressed fluid comprising a bell adapted to produce vibrations of the fluid discharging therethrough, a fluid inlet orifice opening into the bell, a divergent discharge conduit arranged substantially centrally of the bell and having a discharge orifice located in the vicinity of the inlet orifice, the discharge conduit and a wall of the bell defining an annular chamber for the fluid vibrations, and a trumpet disposed upon said divergent conduit.

6. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice located in the vicinity of the inlet orifice, the discharge conduit and a wall of the bell defining an annular chamber for the fluid vibrations, and a core disposed in one of said orifices to produce an annular fluid stream, 7. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice registering with the inlet orifice, the discharge conduit and a wall of the bell defining an annular chamber for the fluid vibrations, and a core disposed in said registering orifices to produce an annular fluid stream.

8. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice located in the vicinity of the inlet orifice, the discharge conduit and a wall of the bell defining an annular chamber for the fluid vibrations, and means for adjusting the height of said bell to vary the tone of the whistle.

9. A whistle operated by a compressed fluid comprising a bell adapted to produce vibrations of the fluid discharging therethrough, a fluid inlet orifice opening into the bell, a discharge conduit arranged substantially centrally of the bell and having a discharge orifice located in the vicinity of the inlet orifice, the discharge conduit and a wall of the bell defining an annular chamber for the fluid vibrations, the said conduit being adjustable axially of said bell to vary the tone of the whistle.

In testimony that I claim the foregoing as my invention I have signed my name in presence of one subscribing witness.

FRANÇOIS LIMON.

Witness:
MAURICE RUEN.